United States Patent
Aizono et al.

(10) Patent No.: US 6,633,809 B1
(45) Date of Patent: *Oct. 14, 2003

(54) WIRELESS METHOD AND SYSTEM FOR PROVIDING NAVIGATION INFORMATION

(75) Inventors: Takeiki Aizono, Kawasaki (JP); Makoto Shioya, Tokyo (JP); Koichi Sano, Yokohama (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/639,524

(22) Filed: Aug. 15, 2000

(51) Int. Cl.⁷ .............................................. G01C 21/32
(52) U.S. Cl. ........................ 701/200; 701/211; 340/990; 342/357.09
(58) Field of Search ................................. 701/200, 208, 701/211, 213, 214; 340/990, 995, 991; 455/456; 342/357.09

(56) References Cited

U.S. PATENT DOCUMENTS

| | | | | |
|---|---|---|---|---|
| 5,043,736 A | * | 8/1991 | Darnell et al. ............ | 342/357.1 |
| 5,172,321 A | * | 12/1992 | Ghaem et al. ............... | 701/201 |
| 5,208,756 A | * | 5/1993 | Song ......................... | 340/991 |
| 5,528,248 A | * | 6/1996 | Steiner et al. ............... | 342/357 |
| 5,543,789 A | * | 8/1996 | Behr et al. .................. | 340/995 |
| 5,712,899 A | * | 1/1998 | Pace, II ........................ | 379/58 |
| 5,760,742 A | * | 6/1998 | Branch et al. ............... | 342/457 |
| 5,786,789 A | * | 7/1998 | Janky ....................... | 342/357.1 |
| 5,875,412 A | * | 2/1999 | Sulich et al. ................ | 340/988 |
| 5,987,375 A | * | 11/1999 | Tamai ......................... | 701/200 |
| 5,987,381 A | * | 11/1999 | Oshizawa ..................... | 701/209 |
| 6,023,232 A | * | 2/2000 | Eitzenberger ................ | 340/426 |
| 6,026,375 A | * | 2/2000 | Hall et al. ................... | 701/201 |
| 6,088,649 A | * | 7/2000 | Kadaba et al. ............... | 701/201 |
| 6,144,336 A | * | 11/2000 | Preston et al. .......... | 342/357.09 |
| 6,148,261 A | * | 11/2000 | Obradovich et al. ... | 340/286.01 |
| 6,182,010 B1 | * | 1/2001 | Berstis ........................ | 701/211 |
| 6,202,023 B1 | * | 3/2001 | Hancock et al. ............. | 701/201 |
| 6,268,837 B1 | * | 7/2001 | Kobayashi et al. .......... | 345/1.1 |
| 6,285,889 B1 | * | 9/2001 | Nykanen et al. ............. | 455/557 |
| 6,292,745 B1 | * | 9/2001 | Robare et al. .............. | 701/208 |
| 6,317,684 B1 | * | 11/2001 | Roeseler et al. ............ | 701/202 |

* cited by examiner

*Primary Examiner*—Tan Q. Nguyen
(74) *Attorney, Agent, or Firm*—Townsend and Townsend and Crew LLP

(57) ABSTRACT

According to the present invention, techniques for sharing and providing navigation information. Embodiments according to the invention can exchange geographic location information between two or more devices using a wireless communications connection. Navigation information, including geographic locations, as well as information related to sites at the geographic locations can be stored by the various devices and exchanged in response to a specific request made by a user or a general upload/download process. Specific embodiments include systems, methods and apparatuses.

21 Claims, 17 Drawing Sheets

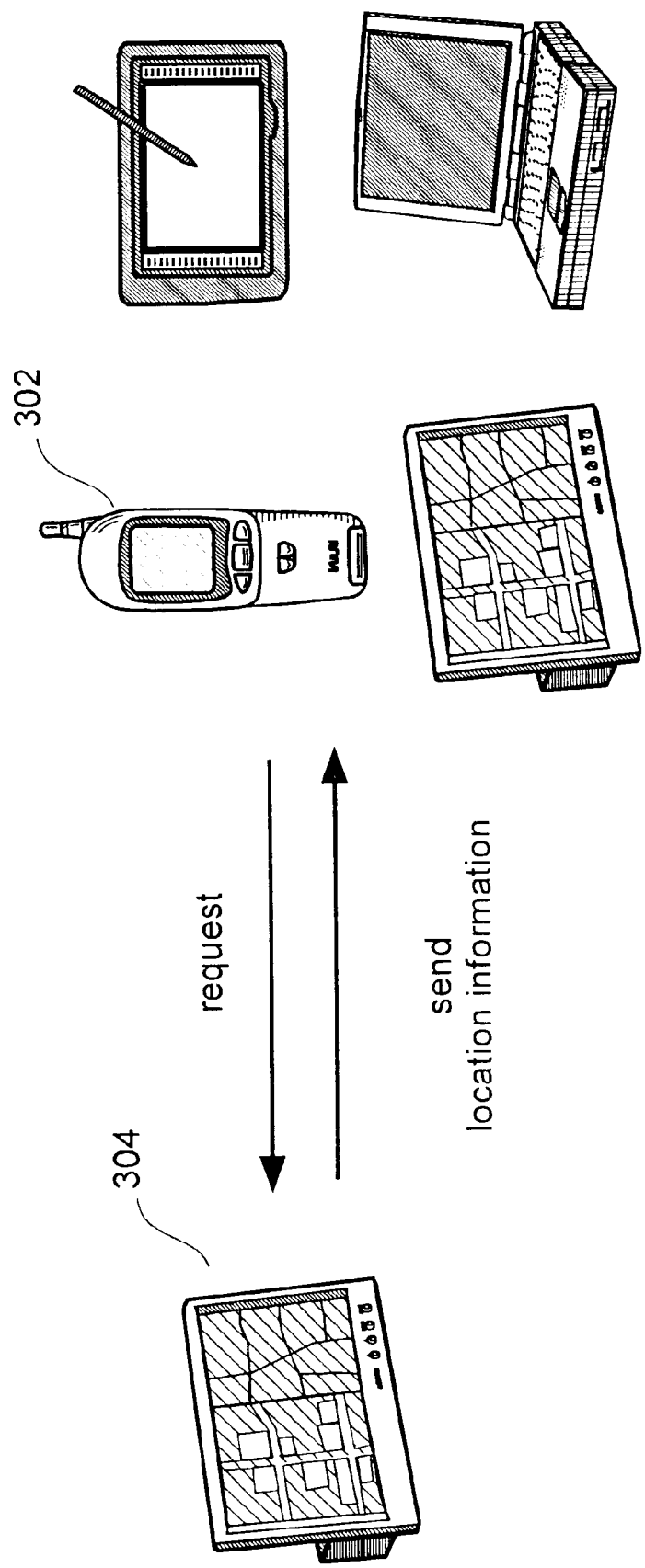

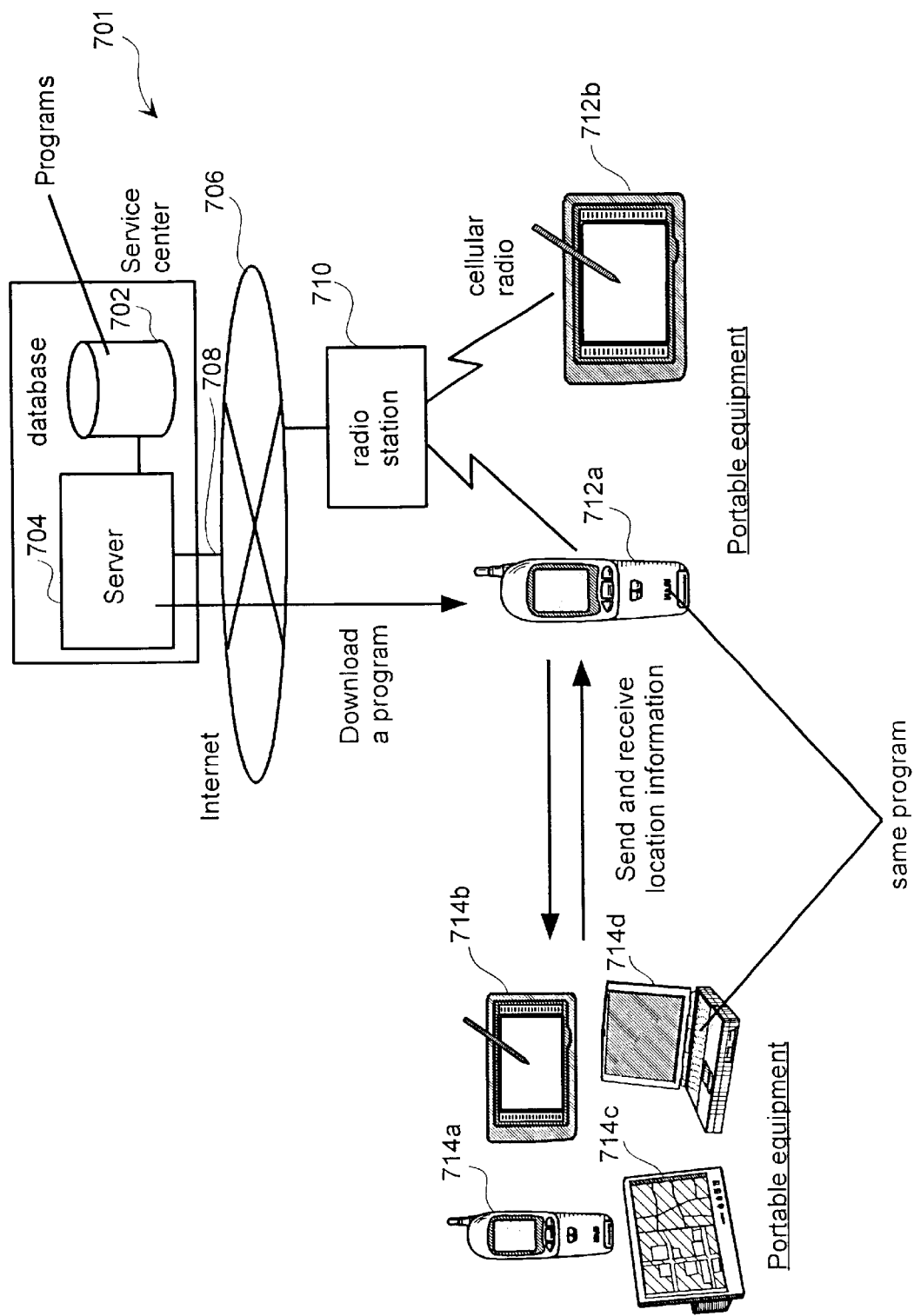

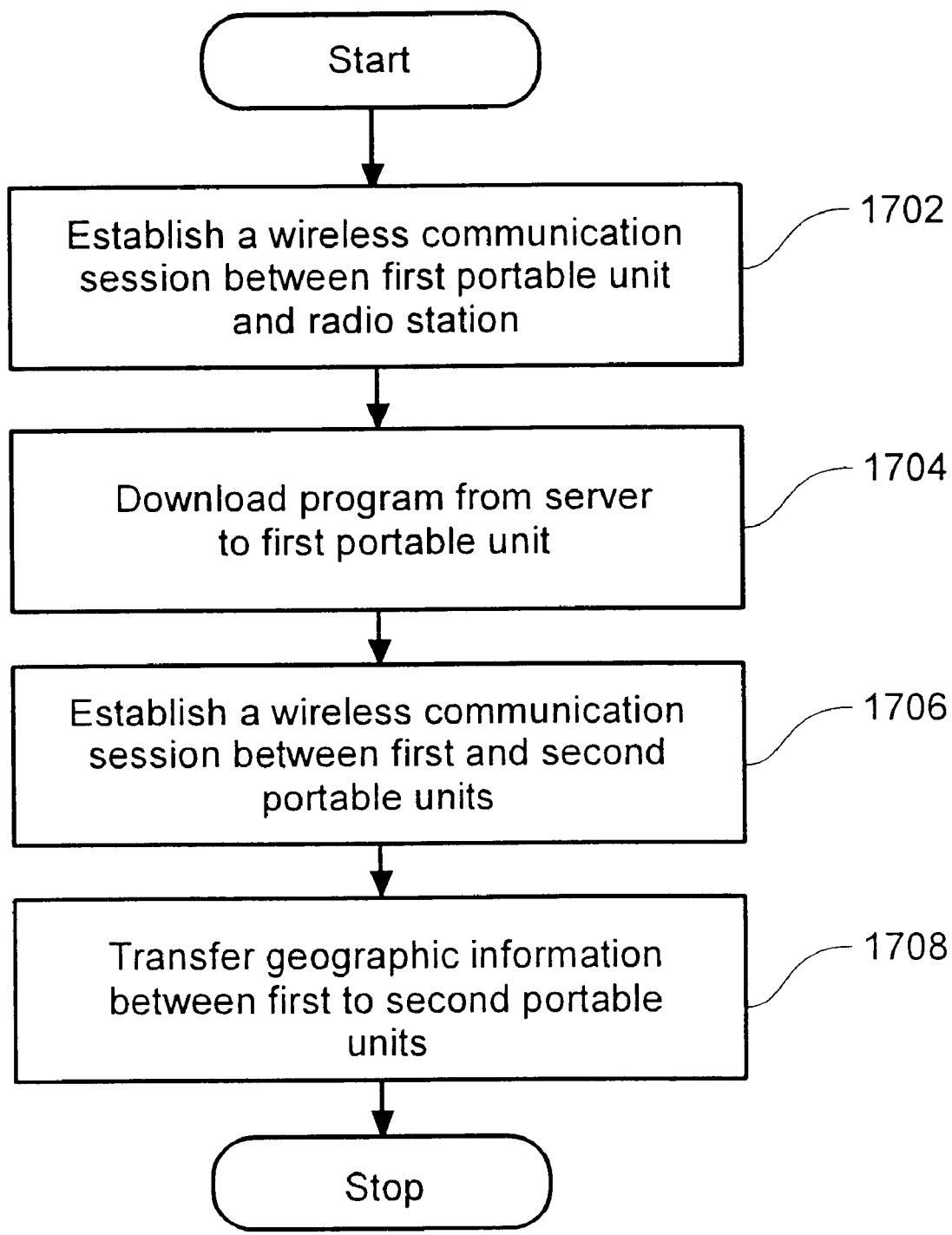

US 6,633,809 B1

WIRELESS METHOD AND SYSTEM FOR PROVIDING NAVIGATION INFORMATION

BACKGROUND OF THE INVENTION

The present invention relates generally to navigation systems, and specifically to techniques for providing information to and receiving information from navigation equipment over wireless communication media.

Navigational systems in vehicles provide easier ways to determine how to find a particular location. Further, such conventional navigation systems can assist the user in determining where the vehicle is at any time, making getting lost a thing of the past. While certain advantages are perceived with such conventional systems, opportunities for gaining further functionality and efficiency exist. For example, in conventional systems, it is still necessary to specify the desired location of interest to the navigation system using a manual input mechanism, for example. In such conventional systems, there is heretofore no reliable way to automatically specify location information to the navigational system.

What is really needed are techniques for providing navigation information and sharing navigational information with navigational systems.

SUMMARY OF THE INVENTION

According to the present invention, techniques for sharing and providing navigation information are provided. Embodiments according to the invention can exchange geographic location information between two or more devices using a wireless communications connection. Navigation information, including geographic locations, as well as information related to sites at the geographic locations can be stored by the various devices and exchanged in response to a specific request made by a user or a general upload/download process. Specific embodiments include systems, methods and apparatuses.

In a representative embodiment according to the present invention, a method for providing navigation information can comprise a variety of elements. For example, the method can comprise receiving at a first unit a selection of one or more geographic locations. The first unit can be a cellular telephone, a personal data assistant (PDA), a portable computer, a car navigation apparatus, or the like. The geographic locations can represent travel locations, for example. Establishing a communication connection between the first unit and a second unit, in which to forward the one or more geographic locations from the first unit to the second unit is also part of the method. The second unit can be a vehicle navigation system, a cellular telephone, a personal data assistant (PDA), a portable computer, or a car navigation apparatus, for example. The communication connection can be a wireless communication connection according to a short range wireless communication protocol, or cellular protocols, or the like. In presently preferred embodiments, the wireless communication can be in accordance with any of Infrared Data Association (IRDA), Bluetooth, i-mode, and the like, for example. However, other communications protocols could be used in various embodiments readily apparent to those of ordinary skill in the art without departing from the scope of the invention. Further, the method can include displaying at the second unit a map presentation, in which the one or more geographic locations are illustrated with respect to a position. The position related information for the map may be retrieved from a variety of sources. For example, a data base may store the position related information on a CD-ROM, a DVD, a DASD, or the like. In other embodiments, the position related information can be retrieved from a Global Positioning System (GPS), and the like.

In another representative embodiment according to the present invention, a method for providing navigation information is provided. The method can include establishing a wireless communications connection between a portable device and a car navigation unit, for example. The portable device can be a vehicle navigation system, a cellular telephone, a personal data assistant (PDA), a portable computer, or a car navigation apparatus, for example. Then, responsive to establishing the wireless communications connection, searching at the car navigation unit for location information can be performed. The method also includes sending the location information to the portable device.

In a further representative embodiment according to the present invention, a method for providing navigation information is provided. The method can include establishing a wireless communications connection between a first portable device and another portable device, and establishing a wireless communications connection between the first portable device and a car navigation unit. The method can also include receiving at the first portable device information about one or more locations from the second portable device. Further, forwarding the information about the one or more locations from the first portable device to the car navigation unit can also be part of the method.

In a yet further representative embodiment according to the present invention, an apparatus for providing navigation information is provided. The apparatus can comprise a processor, a memory, a communication interface, a display, an input device, and a bus that interconnects the processor, the memory the communication interface, the display and the input device. When the input device receives a selection of one or more geographic locations stored in the memory, the communication interface establishes wireless communication with a second unit. Then, the processor forwards the geographic location information via the communication interface for display on a map presentation at the second unit.

In a still further representative embodiment according to the present invention, a method for providing navigation information is provided. The method can include establishing a first wireless communications connection between a first portable device and a radio station. The method can also include sending a program to save geographic location information from the server to the first portable device via the first wireless communications connection between the first portable device and the radio station. Establishing a second wireless communications connection between the first portable device and a second device and transferring geographic location information between the first portable device and the second device via the second wireless communications connection can also be part of the method. The program sent to the first device by the server is substantially similar to a program resident in the second device.

In a still yet further representative embodiment according to the present invention, a method of rendering transportation services to a geographic location is provided. The method can include receiving a customer into a vehicle. The vehicle can be a taxi, a privately owned car, a rental car, a bus or the like. The method also includes establishing a wireless communication connection between a first device, which corresponds to the customer, and a second device, which corresponds to the vehicle. The first device can be a vehicle navigation system, a cellular telephone, a personal data assistant (PDA), a portable computer, or a car navigation apparatus, for example, but is a cellular telephone in a presently preferred embodiment. The second device can also comprise a vehicle navigation system, a cellular telephone, a personal data assistant (PDA), a portable computer, or a car navigation apparatus, for example, but is a vehicle navigation system in a presently preferred embodiment. The method further includes selecting at the first device at least one geographic location that represents a desired destination for the customer. Then, the method includes receiving at the second device the at least one geographic location from the first device via the communications connection and displaying at the second device a map presentation that includes the at least one geographic location.

In specific embodiments, the invention can also provide methods of rendering transportation services to a geographic location. Such methods can include, for example, sending an indication of a fare due from the second device to the first device. In specific embodiments, the method can also include sending payment instructions from the first device to the second device. Payment instructions can include bank card information, and the like, for example. In some specific embodiments, the bank card information can by encrypted.

It is an object of specific embodiments according to the present invention to provide improved techniques for providing and sharing geographic information.

Numerous benefits are achieved by way of the present invention over conventional techniques. The present invention can provide embodiments in which users can communicate location information to a taxi driver with relatively greater precision than can be done verbally. In some specific embodiments provide users with the capability to communicate location information to many car navigation systems, such as navigation systems equipped to privately owned cars, taxis, rental cars, and the like. Further, in some specific embodiments, once a user has visited a place by bus or a taxi, the user can find the same place by privately owned car or by rental car using location information stored to the user's cellular telephone, for example.

These and other benefits are described throughout the present specification. A further understanding of the nature and advantages of the invention herein may be realized by reference to the remaining portions of the specification and the attached drawings.

BRIEF DESCRIPTION OF THE DRAWINGS

FIG. 3 illustrates a diagram of a representative request/response exchange of geographic information in a specific embodiment according to the present invention;

FIG. 7 illustrates a diagram of a representative request/response for geographic information programs from a server in a specific embodiment according to the present invention;

FIG. 7A illustrates a flowchart of representative processing for providing geographic information in a request/response for geographic information programs in a specific embodiment according to the present invention;

DESCRIPTION OF THE SPECIFIC EMBODIMENTS

The present invention provides techniques for sharing and providing navigation information over wireless communication connections. Embodiments according to the invention can exchange geographic location information between two or more devices using a wireless communications connection. Navigation information, including geographic locations, as well as information related to sites at the geographic locations can be stored by the various devices and exchanged in response to a specific request made by a user or a general upload/download process. Specific embodiments include systems, methods and apparatuses.

Figure 1:
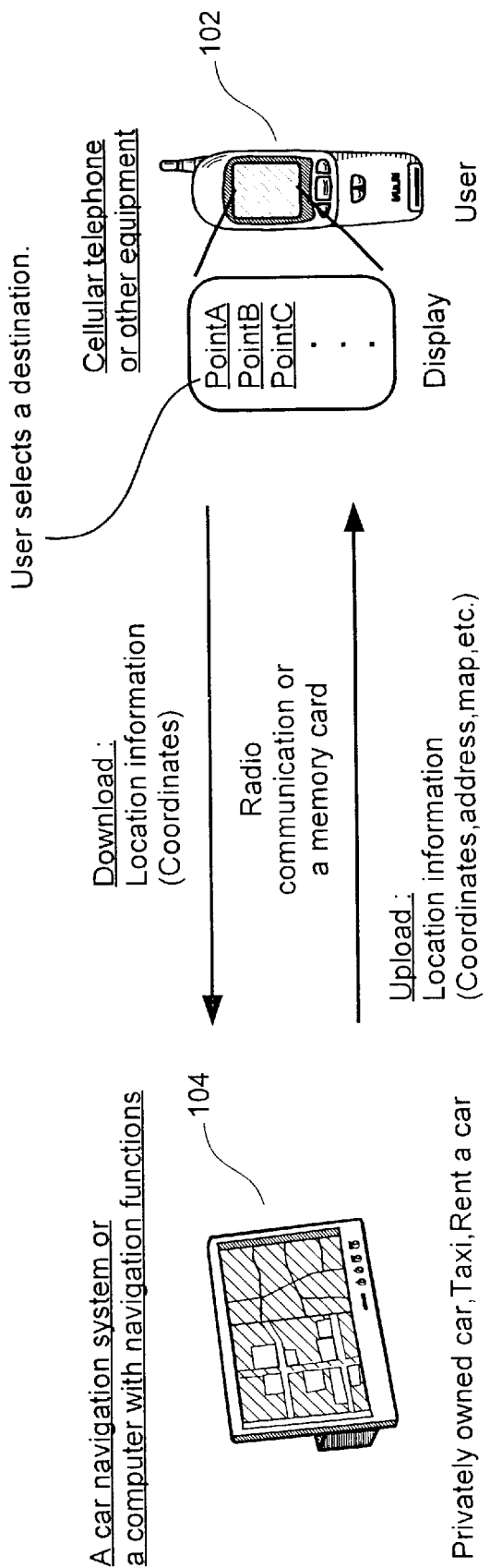
FIG. 1 illustrates a diagram of a representative geographic information exchange for vehicle navigation in a specific embodiment according to the present invention.

FIG. 1 illustrates a diagram of a representative geographic information exchange for vehicle navigation in a specific embodiment according to the present invention. FIG. 1 illustrates a first unit 102, typically portable, that in specific embodiments can be a cellular telephone, a personal data assistant (PDA), a portable computer, a car navigation apparatus, or the like. Unit 102 can include a display of stored geographic locations, which can be location information, for example. In specific embodiments, the geographic locations can be stored as coordinates, and the like. Such coordinates can be stored as an array or list of approximately 1000, for example, locations. Each point can be represented by an approximately 8 byte identifier, for example. The first unit 102 can receive a selection of one or more geographic locations from among the points stored in unit 102. The selection can be made by a user of the unit 102 responsive to a menu prompt providing a selection, for example, using a scroll down selection window, movable cursor, or the like.

First unit 102 can establish a communication connection with a second unit 104. The second unit 104 can be a vehicle navigation system, a cellular telephone, a personal data assistant (PDA), a portable computer, or a car navigation apparatus, for example. The second unit 104 can be a portable device, like the first unit 102, but in presently preferred embodiments, second unit 104 is a device located within a vehicle, such as a car navigation apparatus mounted in a privately owned automobile, a taxi, a rental car, and the like.

The communication connection can be a wireless communication connection according to a short range wireless communication protocol, a cellular protocol, or the like. In presently preferred embodiments, the wireless communication can be in accordance with any of Infrared Data Association (IRDA), Bluetooth, i-mode, and the like, for example. However, other communications protocols could be used in various embodiments without departing from the scope of the invention, as will be readily apparent to those of ordinary skill in the art.

Having established a wireless communication connection between the first unit 102 and second unit 104, geographic locations can be forwarded from the first unit 102 to the second unit 104, for example, via the wireless communication connection.

The geographic locations provided by the first unit 102 to the second unit 104 can be displayed by the second unit as a map presentation, for example. The map presentation can include one or more geographic locations provided by the first unit 102. In specific embodiments, position related information corresponding to the geographic locations provided by the first unit 102 can be retrieved by the second unit 104, and then used to create the map display. For example, in specific embodiments, position related information can comprise any of an address, a telephone number, one or more coordinates, latitude and longitude, a narrative comment, advertising, traffic information, and/or associated points of interest.

The position related information for the map may be retrieved from a variety of sources. For example, a data base may store the position related information on a CD-ROM, a DVD, a DASD or the like. In other embodiments, the position related information can be retrieved from a Global Positioning System (GPS), and the like.

Figure 1A:
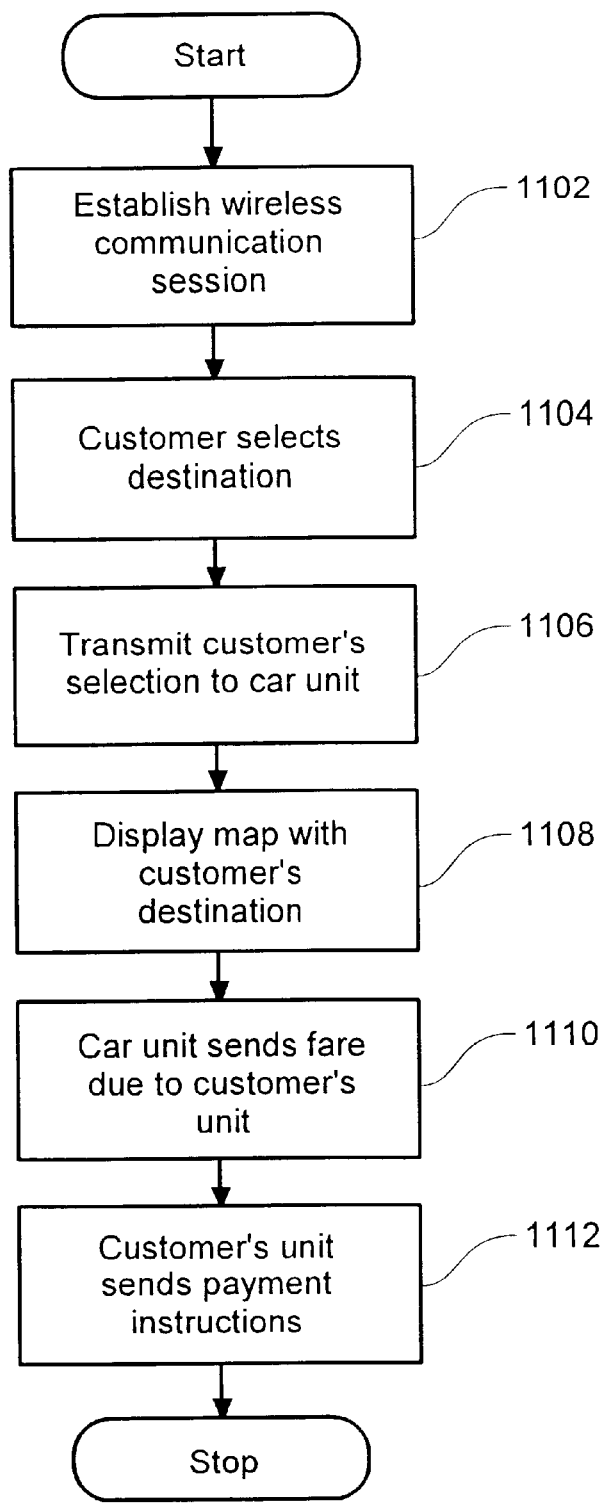
FIG. 1A illustrates a flowchart of representative processing for rendering transportation services to a geographic location in a specific embodiment according to the present invention.

In a specific embodiment, such as illustrated by FIG. 1, users can communicate location information to a provider of transportation services, such as a taxi driver, for example. FIG. 1A illustrates a flowchart of processing in a representative embodiment, in which a method of rendering transportation services to a geographic location, is provided. FIG. 1A illustrates a step 1102, in which, upon receiving a customer into a vehicle for hire, a wireless communication connection is established between a first device, belonging to the customer, and a second device, belonging to the vehicle. The vehicle for hire can by any of a taxi, a bus, a rental car or the like. Then, in a step 1104, the customer makes a selection of a geographic location using the first device. The geographic location can be a desired destination for the customer. In specific embodiments, the customer can make multiple selections of geographic locations to form a "trip plan." Then, in a step 1106, the customer's selection of a geographic location is sent from the first device to the second device via the communications connection. Then, in a step 1108, a map is displayed by the second device. The map display includes information about the geographic location selected by the customer. In a step 1110, an indication of a fare due is sent from the second device to the first device. Then, in a step 1112, payment instructions are sent from the first device to the second device. In specific embodiments, the payment instructions can include bank card information and the like. In some specific embodiments, the payment instructions can be encrypted by the first device prior to sending the instructions to the second device. The second device can decrypt the payment instructions.

In specific embodiments, such as illustrated by FIGS. 1 and 1A, users can communicate location information to a taxi driver, for example, with relatively greater precision than can be done verbally. Some specific embodiments provide users with the capability to communicate location information to many car navigation systems, such as navigation systems equipped in privately owned cars, taxis, rental cars, and the like. Further, in some specific embodiments, once a user has visited a place by bus or a taxi, the user can find the same place by privately owned car or by rental car using location information stored to the user's cellular telephone, for example.

Figure 2:
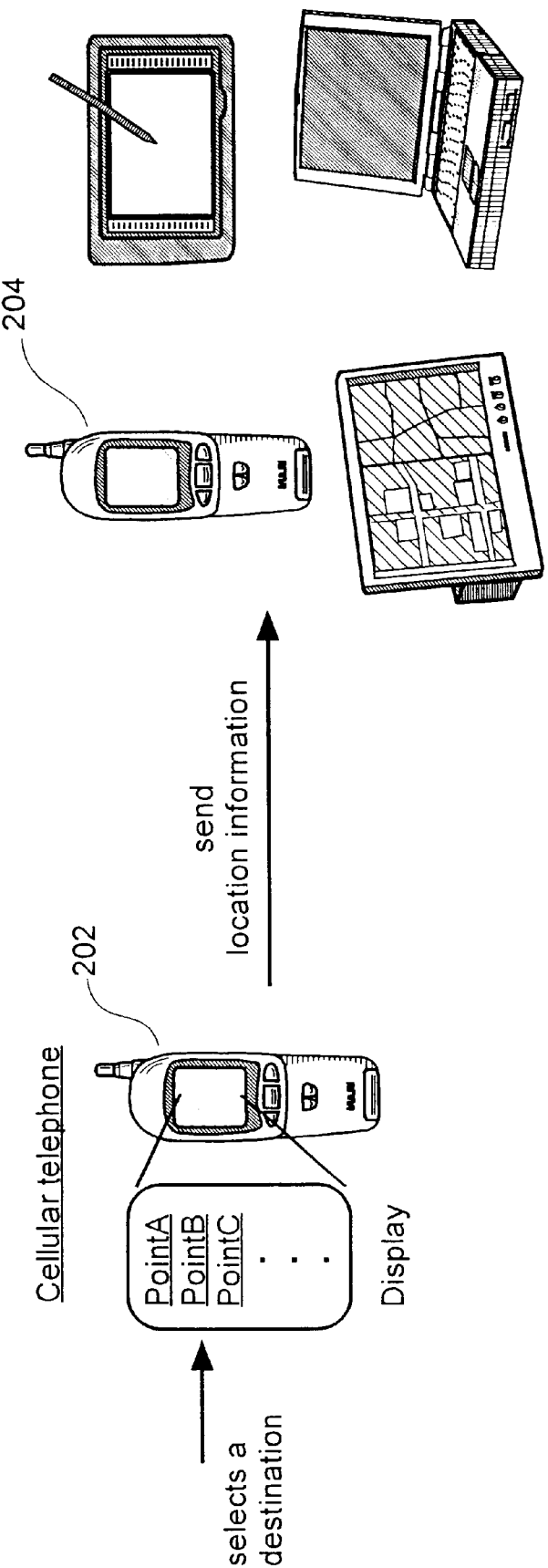
FIG. 2 illustrates a diagram of a representative geographic information display and forwarding in a specific embodiment according to the present invention.

FIG. 2 illustrates a diagram of a representative geographic information display and forwarding in a specific embodiment according to the present invention. FIG. 2 illustrates a specific embodiment having a cellular telephone 202 in communication with a second unit 204. Second unit 204 can be any of a second cellular telephone, a personal data assistant (PDA), a portable computer, or a car navigation apparatus, for example. Cellular telephone 202 can display a list of locations to a user. The user can select one or more locations using controls of the cellular telephone 202. The cellular telephone 202 can send the location information to the second unit 204.

Figure 2A:
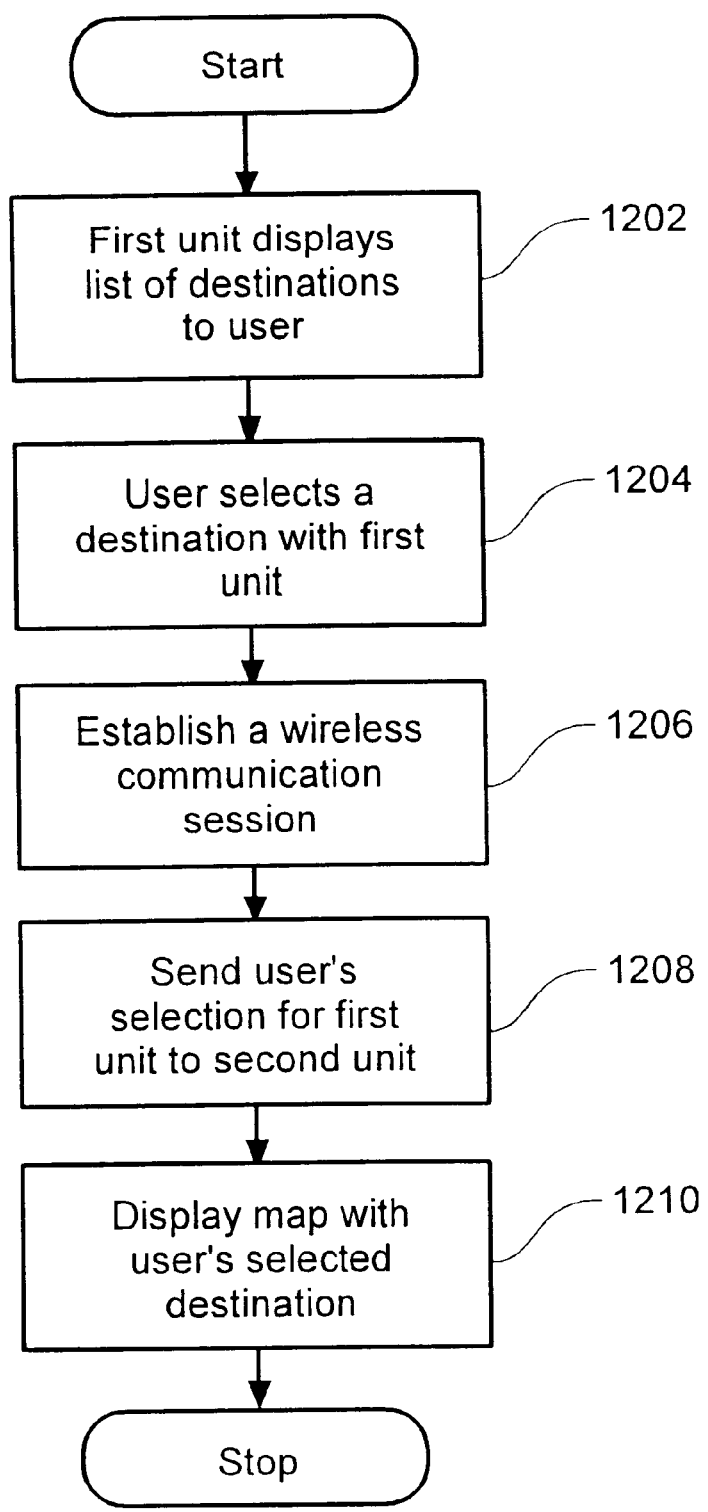
FIG. 2A illustrates a flowchart of a representative processing for geographic information display and forwarding in a specific embodiment according to the present invention.

FIG. 2A illustrates a flowchart of a representative processing for geographic information display and forwarding in a specific embodiment according to the present invention. FIG. 2A illustrates a step 1202 of displaying at a first unit a list of geographic locations from which particular ones may be selected. Then, at a step 1204, making at the first unit a selection of one or more geographic locations. Next, in a step 1206, a wireless communication is established between the first unit and a second unit. In a step 1208, the user's selected geographic location(s) can be forwarded from the first unit to the second unit via the wireless communication connection. Then, in a step 1210, a map presentation can be displayed at the second unit. The map presentation includes the user's selected geographic location(s).

In the specific embodiments, such as that illustrated by FIGS. 2 and 2A, the location information is entered in the cellular telephone 202. This location information is sent to the second unit 204 over an established wireless communications connection.

FIG. 3 illustrates a diagram of a representative request/response exchange of geographic information in a specific embodiment according to the present invention. FIG. 3 illustrates a specific embodiment having a first unit 302 in communication with a car navigation apparatus 304. First unit 302 can be any of a cellular telephone, a personal data assistant (PDA), a portable computer, or a car navigation apparatus, for example. The user can select one or more geographic locations using controls of the first unit 302 from a list of locations displayed to the user. The request is communicated to the car navigation apparatus 304, which searches for information corresponding to the user's request.

The car navigation 304 can send the location information to the requesting first unit 302.

Figure 3A:
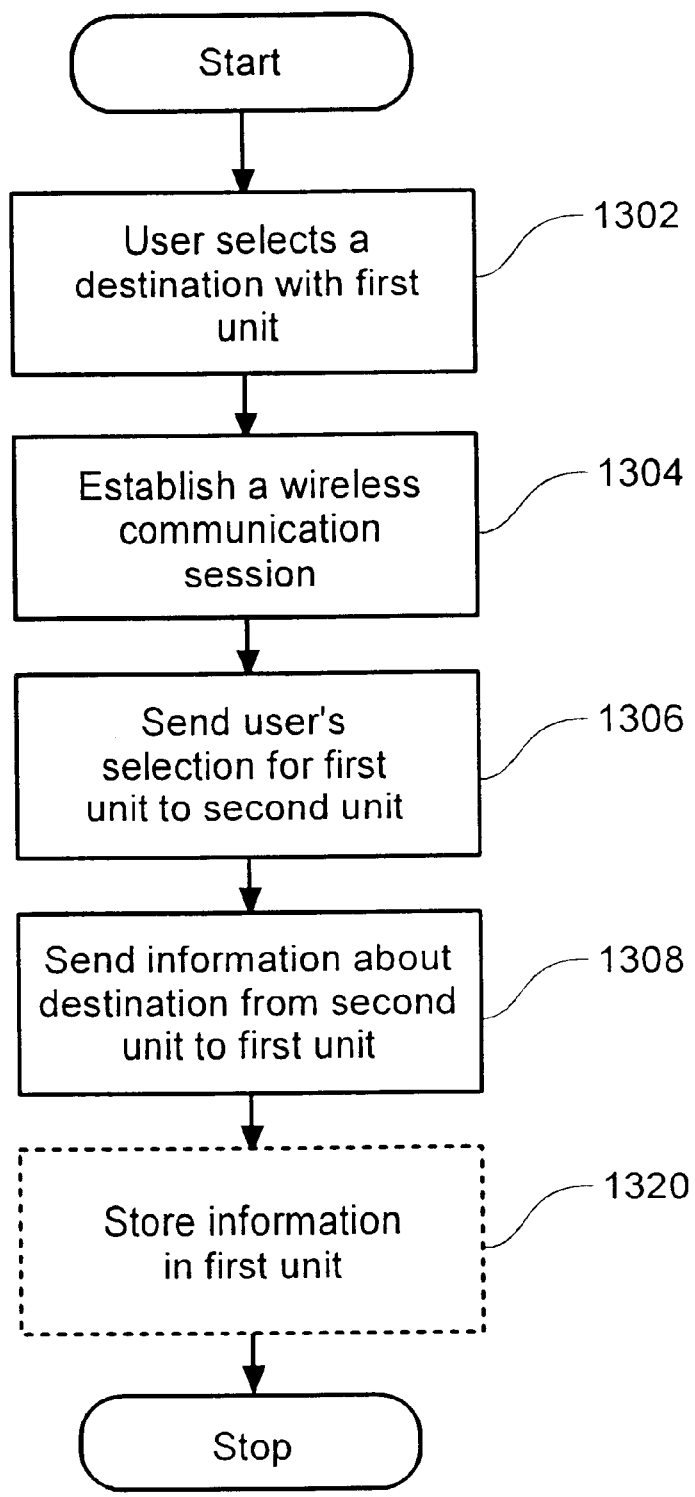
FIG. 3A illustrates a flowchart of a representative processing for request/response exchange of geographic information in a specific embodiment according to the present invention.

FIG. 3A illustrates a flowchart of a representative processing for request/response exchange of geographic information in a specific embodiment according to the present invention. FIG. 3A illustrates a step 1302 of receiving at a first unit a selection of one or more geographic locations. Then, in a step 1304, a wireless communication is established between the first unit and a second unit. Next, in a step 1306, the one or more geographic locations is forwarded from the first unit to the second unit via the communication. Then, in a step 1308, information about the one or more of locations is sent from the second unit to the first unit. In an optional step 1320, the information can be stored in the first unit.

In the specific embodiments, such as that illustrated by FIGS. 3 and 3A, the location information is stored in the car navigation 304. This location information is sent to the first unit 302 over an established wireless communications connection.

Figure 4:
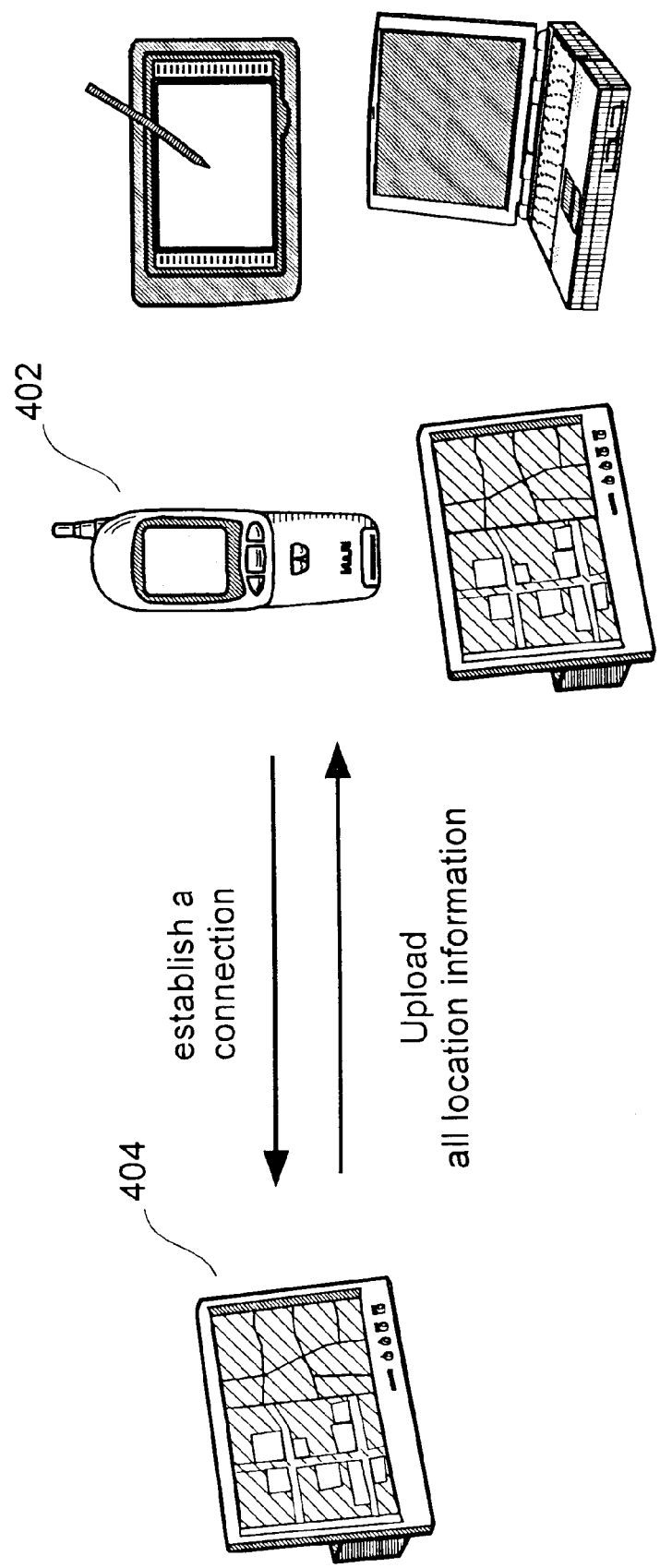
FIG. 4 illustrates a diagram of a representative automatic upload of geographic information in a specific embodiment according to the present invention.

FIG. 4 illustrates a diagram of a representative automatic upload of geographic information in a specific embodiment according to the present invention. FIG. 4 illustrates a specific embodiment having a first unit 402 in communication with a car navigation apparatus 404. First unit 402 can be any of a cellular telephone, a personal data assistant (PDA), a portable computer, or a car navigation apparatus, for example. The first unit 402 can establish a wireless communications connection with the car navigation unit 404. Responsive to establishing the connection, the car navigation apparatus 404 can search for location information. Then, the car navigation 404 can send the location information to the first unit 402.

Figure 4A:
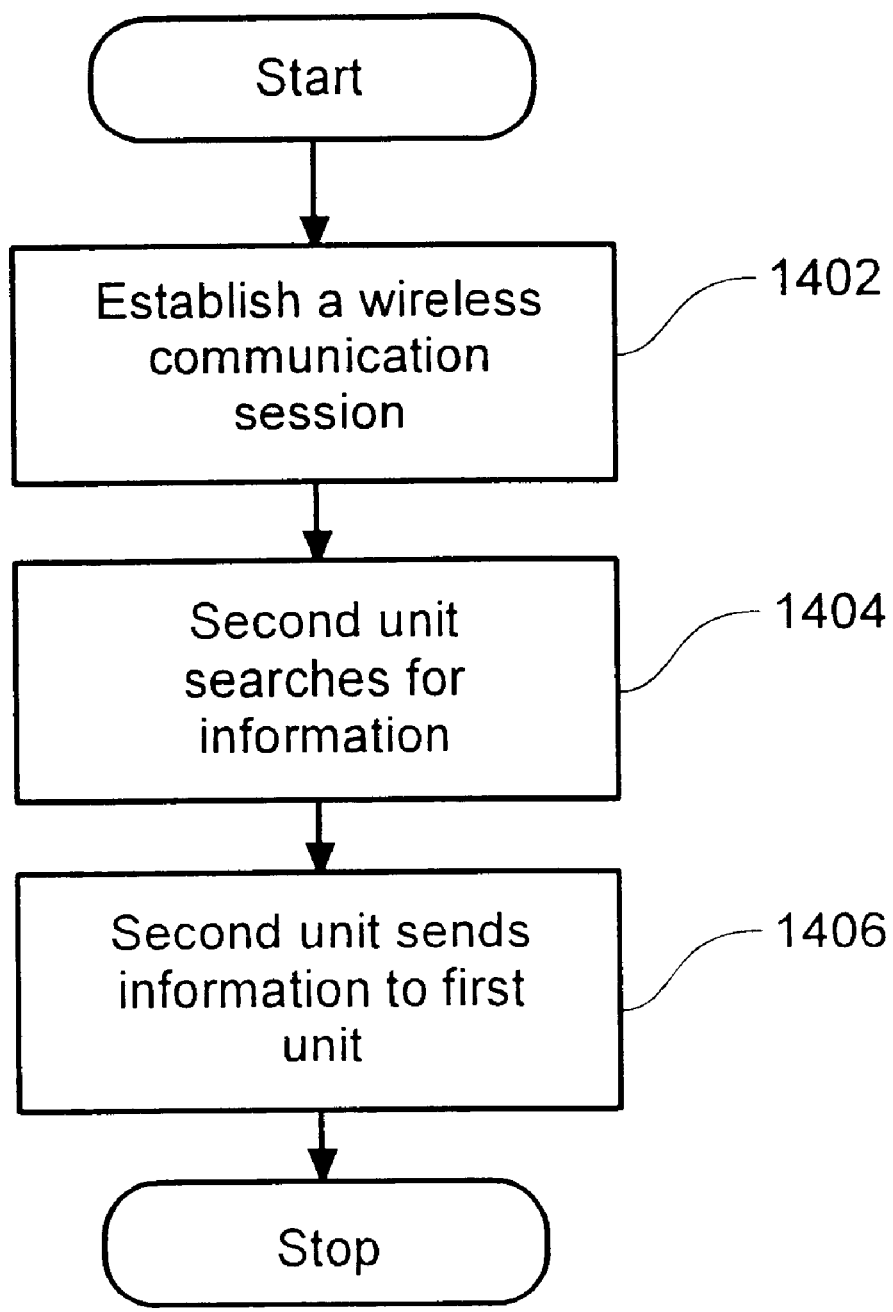
FIG. 4A illustrates a flowchart of a representative processing for automatic upload of geographic information in a specific embodiment according to the present invention.

FIG. 4A illustrates a flowchart of a representative processing for automatic upload of geographic information in a specific embodiment according to the present invention. FIG. 4A illustrates a step 1402 of establishing a wireless communications connection between a portable device and a car navigation unit. Then, in a step 1404, responsive to establishing the wireless communications connection, the car navigation unit searches for location information. Then, in a step 1406, the car navigation unit sends the location information to the portable device.

In the specific embodiments, such as that illustrated by FIGS. 4 and 4A, the location information is stored in the car navigation 404. This location information is sent to the first unit 402 responsive to establishing a wireless communications connection.

Figure 5:
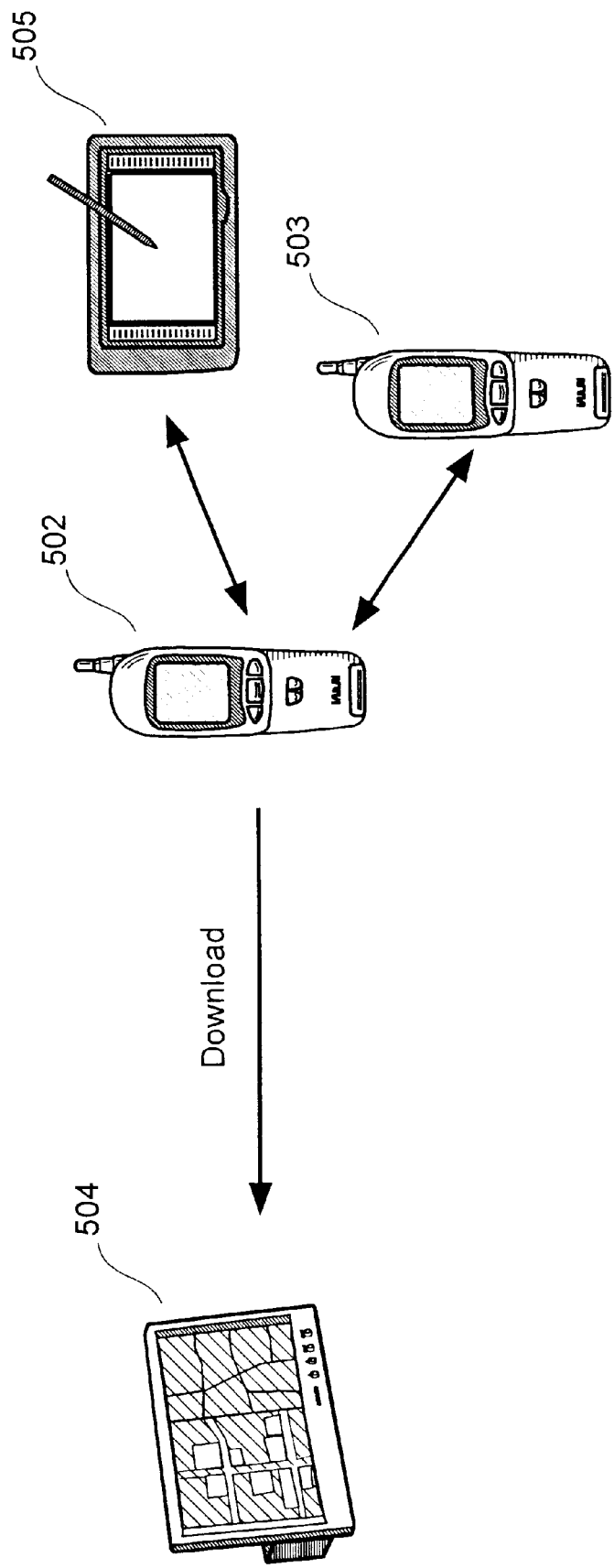
FIG. 5 illustrates a diagram of a representative sharing of geographic information in a specific embodiment according to the present invention.

FIG. 5 illustrates a diagram of a representative sharing of geographic information in a specific embodiment according to the present invention. FIG. 5 illustrates a specific embodiment having a first unit 502 and a second unit 503 in communication with one another and with a car navigation apparatus 504. First unit 502 and second unit 503 can be any of a cellular telephone, a personal data assistant (PDA), a portable computer, or a car navigation apparatus, for example. The first unit 502 can establish a wireless communications connection with the second unit 503. The first unit 502 can establish a wireless communications connection with the car navigation unit 504. Responsive to establishing these connections, the first unit 502 and the second unit 503 can share geographic location information with one another. The first unit 502 can forward geographic information received from the second unit 503 to the car navigation apparatus 504. Further, the first unit 502 can share information received from the car navigation apparatus 504 with the second unit 503. Other units, such as a third unit 505, can also share information with the first unit 502 and second unit 503.

Figure 5A:
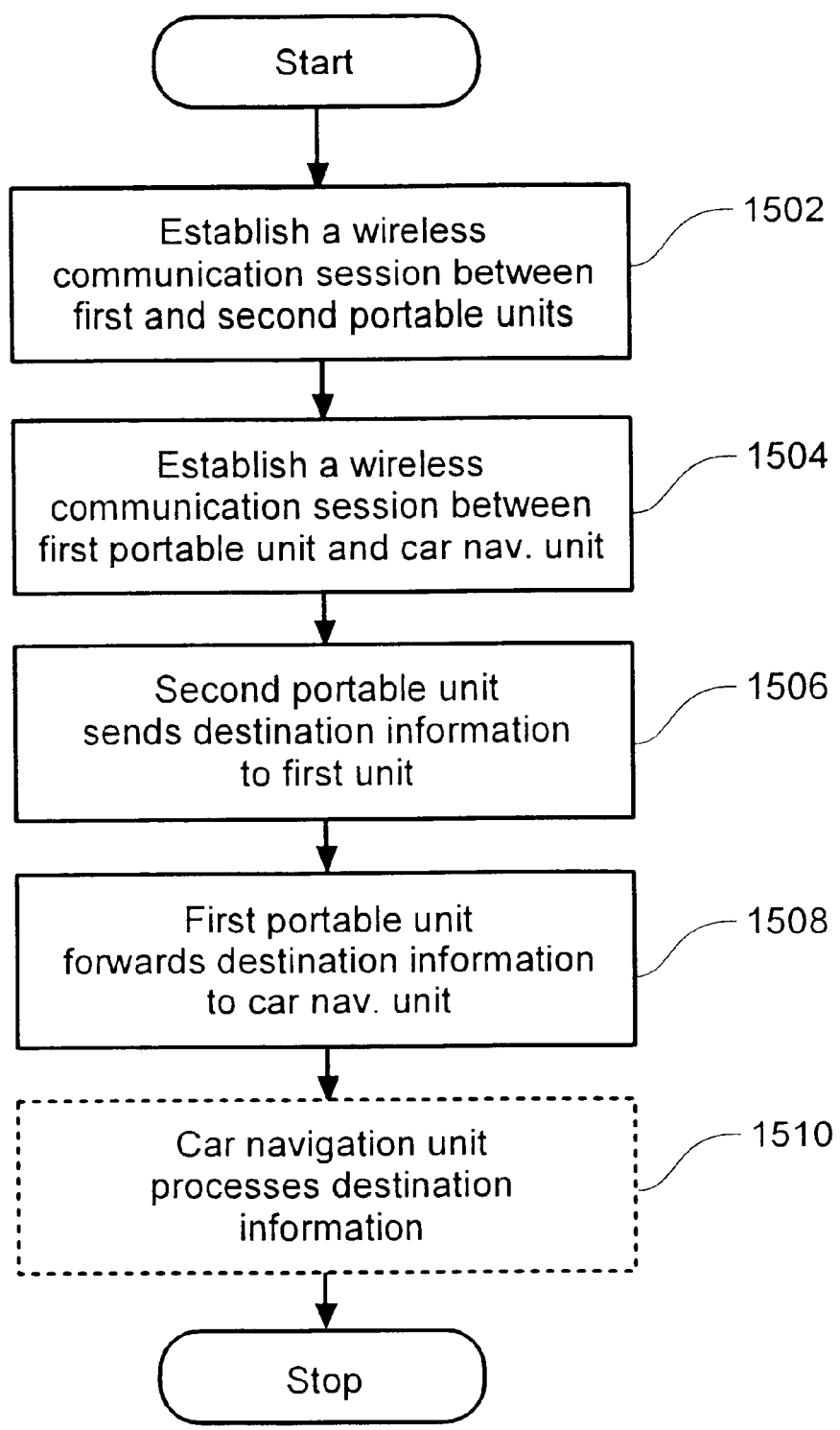
FIG. 5A illustrates a flowchart of representative processing for sharing of geographic information in a specific embodiment according to the present invention.

FIG. 5A illustrates a flowchart of representative processing for sharing of geographic information in a specific embodiment according to the present invention. FIG. 5A illustrates a step 1502 of establishing a first wireless communications connection between a first portable unit and a second portable unit. Then, in a step 1504, a second wireless communications connection is established between the first portable unit and a car navigation unit. Next, in a step 1506, the first portable unit receives information about one or more of locations from the second portable unit via the first wireless communications connection. Then, in a step 1508, the first portable unit forwards the information about the one or more of locations, received from the second portable unit in step 1506, to the car navigation unit via the second wireless communications connection. In an optional step 1510, the car navigation unit can process the destination information received from the first portable unit. Such processing can include, for example, storing the information, providing a map presentation on a display of the car navigation unit, or responding with related information.

Specific embodiments according to the present invention, such as illustrated by FIGS. 5 and 5A, can provide a plurality of heterogeneous equipment with the capability to share location information that may be stored locally. Once retrieved by a requesting portable unit, location information can be forwarded to a vehicle navigation system for presentation, storage, and the like. Further, in specific embodiments, portable units can share information received from a car navigation unit with one another, for example.

Figure 6:
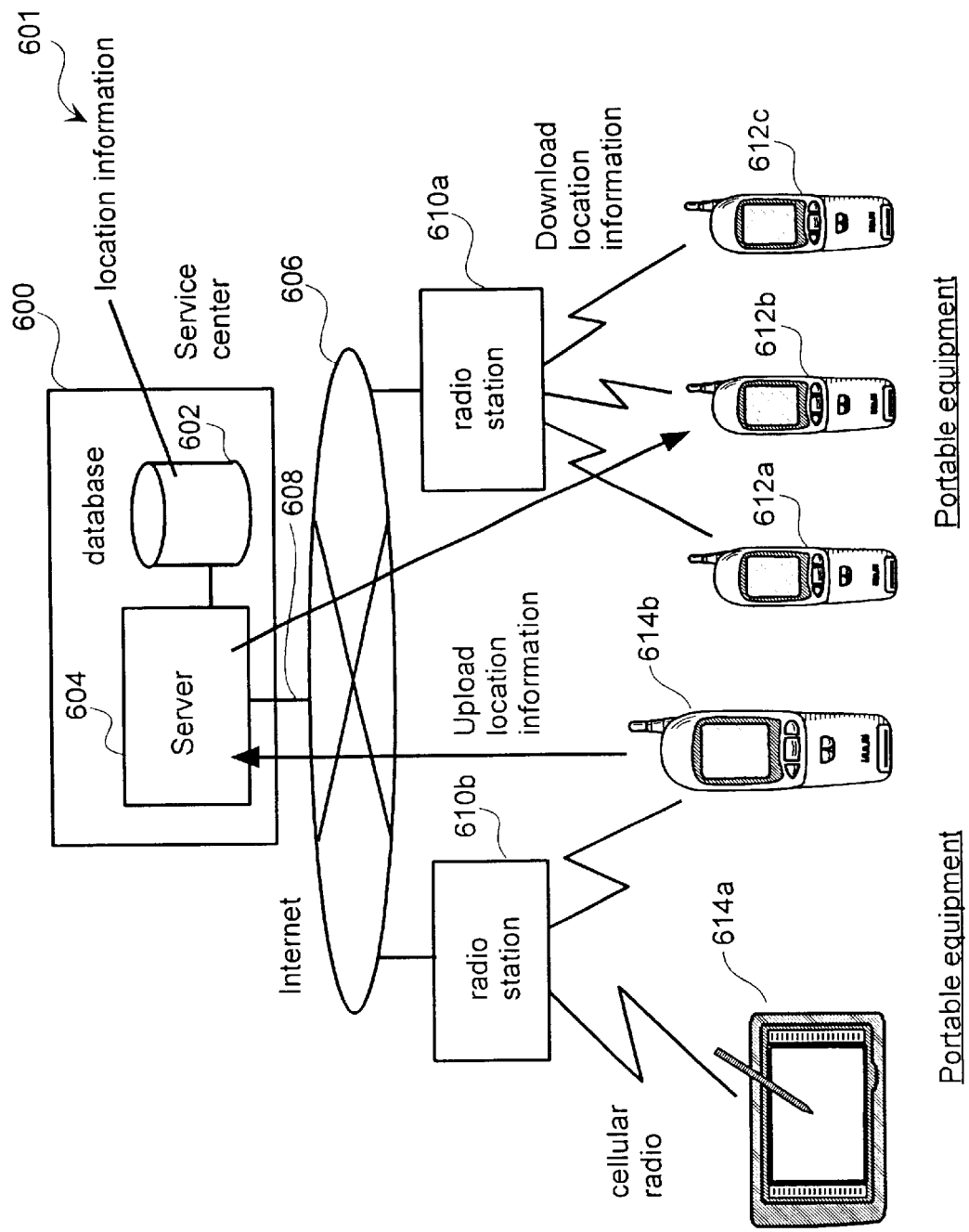
FIG. 6 illustrates a diagram of a representative geographic information service center in a specific embodiment according to the present invention.

FIG. 6 illustrates a diagram of a representative geographic information service center in a specific embodiment according to the present invention. FIG. 6 illustrates a communication system 601, comprising a plurality of portable units 614a–614b, in wireless communication with a radio station 610b, in order to provide location information. Portable units 614a–614b can be any of a cellular telephone, a personal data assistant (PDA), a portable computer, or a car navigation apparatus, for example. The radio station 610b can be operated by a telephone company, for example, such as NTT and the like. Portable units 614a–614b can employ a protocol, such as Wireless Application Protocol (WAP), and the like, which is typically dependent upon radio station 610b. Radio station 610b is connected by Internet 606 to a plurality of other devices, including a workstation 604 acting as a server of location information, for example. Workstation 604 can access the internet using an Ethernet TCP/IP, for example, link 608.

Workstation 604 has access to location information stored in a database 602. Workstation 604 may be co-located with database 602 at a service center, for example.

A second plurality of units 612a–612c, are also in wireless communication with a second radio station 610a, in order to receive location information. Portable units 612a–612c can be any of a cellular telephone, a personal data assistant (PDA), a portable computer, or a car navigation apparatus, for example. The radio station 610a can be operated by a telephone company, for example, such as NTT and the like. Portable units 612a–612c can employ a protocol, such as Wireless Application Protocol (WAP), and the like, which is typically dependent upon radio station 610a. Radio station 610a is connected by Internet 606 to a plurality of other devices, including the workstation 604 and radio station 610b.

In a representative embodiment according to the present invention, a first portable unit 614b and the first radio station 610b establish a first wireless communications connection. Then, the first portable unit 614b sends geographic location information to the server 604 via the first wireless communications connection between the first portable unit 614b and the first radio station 610b and via the Internet 606. The server 604 stores the geographic location information in a database 602, for example. A second portable unit 612b and the second radio station 610a establish a second wireless communications connection. The second portable unit 612b requests the geographic location information from the server 604, by making a request via the second wireless communication connection with the second radio station 610a and via the Internet 606. Responsive to the request by the second portable unit 612b, the server 604 forwards the geographic location information to the second portable unit 612b via the second wireless communications connection with the second radio station 610a and via the Internet 606.

Figure 6A:
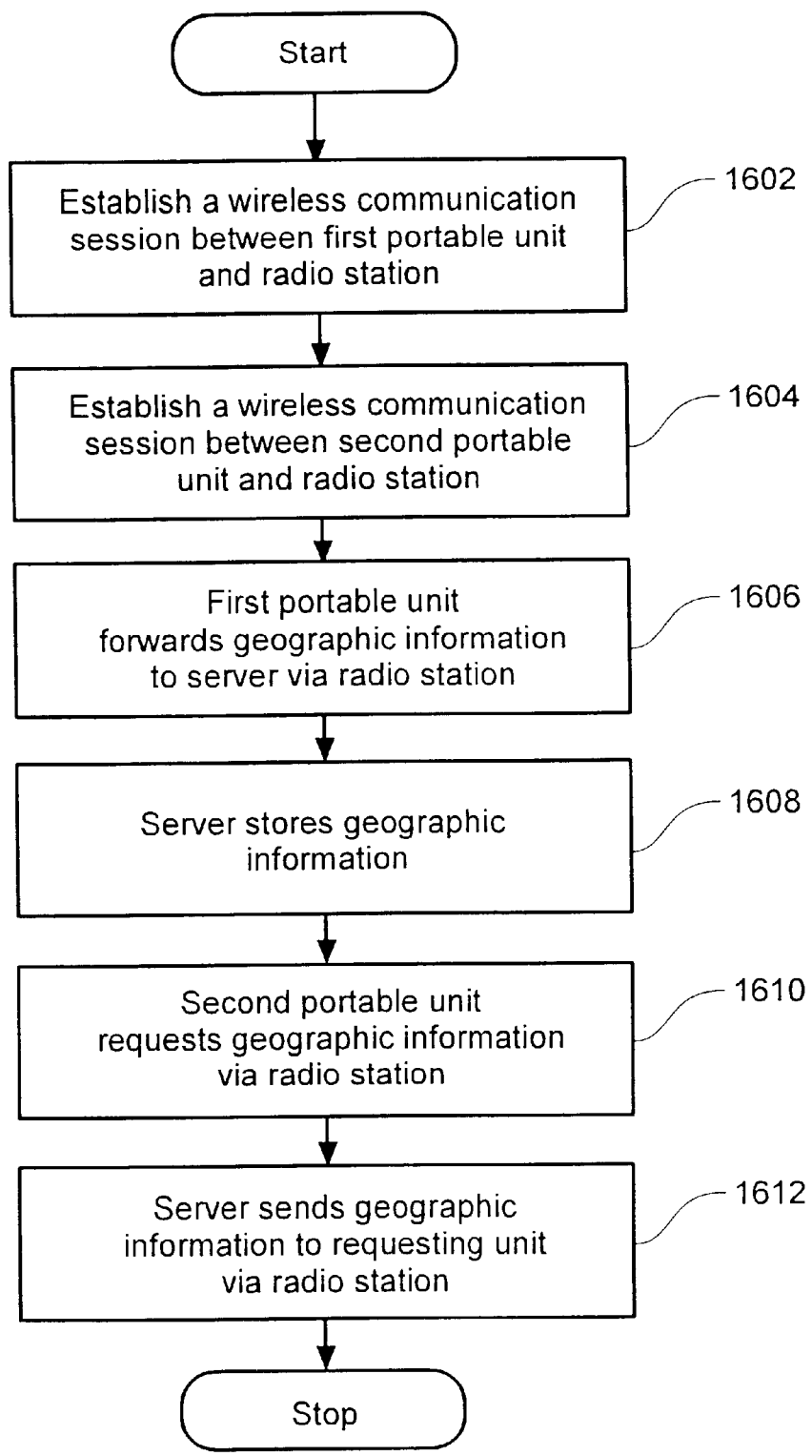
FIG. 6A illustrates a flowchart of representative processing for providing geographic information in a service center in a specific embodiment according to the present invention.

FIG. 6A illustrates a flowchart of representative processing in a method of providing geographic information in a service center in a specific embodiment according to the present invention. FIG. 6A illustrates a step 1602 of establishing a first wireless communications connection between a first portable device and a radio station. Then, in a step 1604, a second wireless communications connection is established between a second portable device and a radio station. Next, in a step 1606, geographic location information is sent from the first portable device to a server via the first wireless communications connection established in step 1602. Then, in a step 1608, the geographic location is stored at the server. Subsequently, in a step 1610, a request is made by a second portable device for geographic location information stored by the server. Then, in a step 1612, the geographical information is sent to the second portable device via the second wireless communications connection established in step 1604.

Specific embodiments according to the present invention, such as illustrated by FIGS. 6 and 6A, can provide a plurality of heterogeneous equipment to share location information that may be stored locally, using a service center. A workstation at the service center can act as a server that gathers the location information from equipment and delivers the location information to other equipment upon request.

FIG. 7 illustrates a diagram of a representative request/response for geographic information programs from a server in a specific embodiment according to the present invention. FIG. 7 illustrates a communication system 701, comprising a plurality of portable units 712a–712b, in wireless communication with a radio station 710. Portable units 712a–712b can be any of a cellular telephone, a personal data assistant (PDA), a portable computer, or a car navigation apparatus, for example. The radio station 710 can be operated by a telephone company, for example, such as NTT and the like. Portable units 712a–712b can employ a protocol, such as Wireless Application Protocol (WAP), and the like, which is typically dependent upon radio station 710. Radio station 710 is connected by Internet 706 to a plurality of other devices, including a workstation 704 acting as a server of location information, via Ethernet TCP/IP, for example, link 708. Workstation 704 has access to location information stored in a database 702. Workstation 704 may be co-located with database 702 at a service center, for example. Operatively disposed in database 702 can be any number of programs which can be downloaded by any of portable units 712a–712b, for example. Further, a second plurality of portable units 714a–714d can establish wireless communications with any of the first plurality of portable units 712a–712b.

In a representative embodiment according to the present invention, a first portable unit 712a and the radio station 710 establish a first wireless communications connection. Then, one or more programs is sent from the server 704 to the first portable unit 712a via the first wireless communications connection between the first portable unit 712a and the radio station 710. Then, the first portable unit 712a establishes a second wireless communications connection with a second portable unit 714a. Then, the first portable unit 712a transfers geographic location information to the second portable unit 714a via the second wireless communications connection. In specific embodiments, the program sent to the first portable unit 712a by the server 704 is substantially similar to a program resident in the second portable unit 714a.

FIG. 7A illustrates a flowchart of representative processing in a method of providing geographic information programs in a request/response exchange in a specific embodiment according to the present invention. FIG. 7A illustrates a step 1702 of establishing a first wireless communications connection between a first portable device and a radio station. Then, in a step 1704, a program to save geographic location information is sent from the server to the first portable device via the first wireless communications connection established in step 1702. Next, in a step 1706, a second wireless communications connection between the first portable device and a second device is established. Then, in a step 1708, geographic location information is transferred between the first portable device and the second device via the second wireless communications connection established in step 1706. The program sent to the first device by the server is substantially similar to a program resident in the second device.

Specific embodiments according to the present invention, such as illustrated by FIGS. 7 and 7A, can provide a plurality of heterogeneous equipment with the capability to download a program. The program can enable equipment to save geographic information and to communicate with other such equipment via a server.

Figure 8:
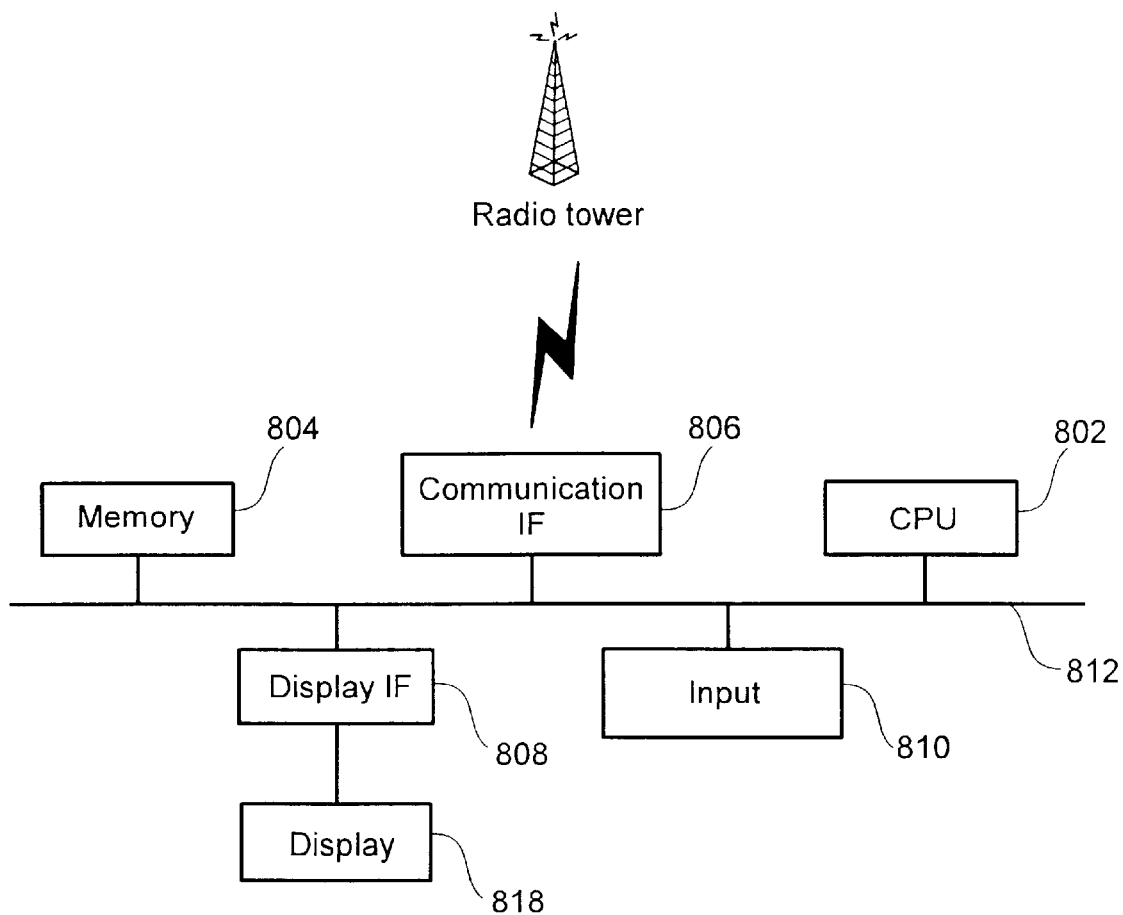
FIG. 8 illustrates a diagram of a representative portable apparatus in a specific embodiment according to the present invention.

FIG. 8 illustrates a diagram of a representative portable apparatus in a specific embodiment according to the present invention. FIG. 8 illustrates a portable apparatus having a processor 802, a memory 804, a communication interface 806, a display interface 808, connecting a display 818, an input device 810, and a bus 812, that interconnects the processor, the memory the communication interface, the display and the input device. Specific embodiments can employ a flash memory for memory 804, for example. Further, in specific embodiments, communication interface 806 can employ any of a variety of protocols, such as an Infrared Data Association (IRDA) protocol, a Bluetooth protocol and an i-mode protocol, for example. Other protocols may be used in embodiments created by those of ordinary skill in the art without departing from the scope of the claimed invention. Apparatus can be embodied in a portable device, semi-portable, or mobile devices, or stationary. form factor devices, such as for example, a cellular telephone, a personal data assistant (PDA), a portable computer and a car navigation apparatus. Other form factors may be used in embodiments created by those of ordinary skill in the art without departing from the scope of the claimed invention.

In a representative embodiment according to the present invention, the memory 804 can store position related information, which can be any of an address, a telephone number, one or more coordinates, latitude and longitude, a narrative comment, advertising, traffic information, and/or associated points of interest, for example.

When the input device receives a selection of one or more of geographic locations stored in the memory 804, the communication interface 806 establishes wireless communication with a second unit. The second unit may be of a similar type or different from the apparatus. Then, the processor 802 forwards the geographic location information via the communication interface 806 for display on a map presentation at the second unit.

Figure 9:
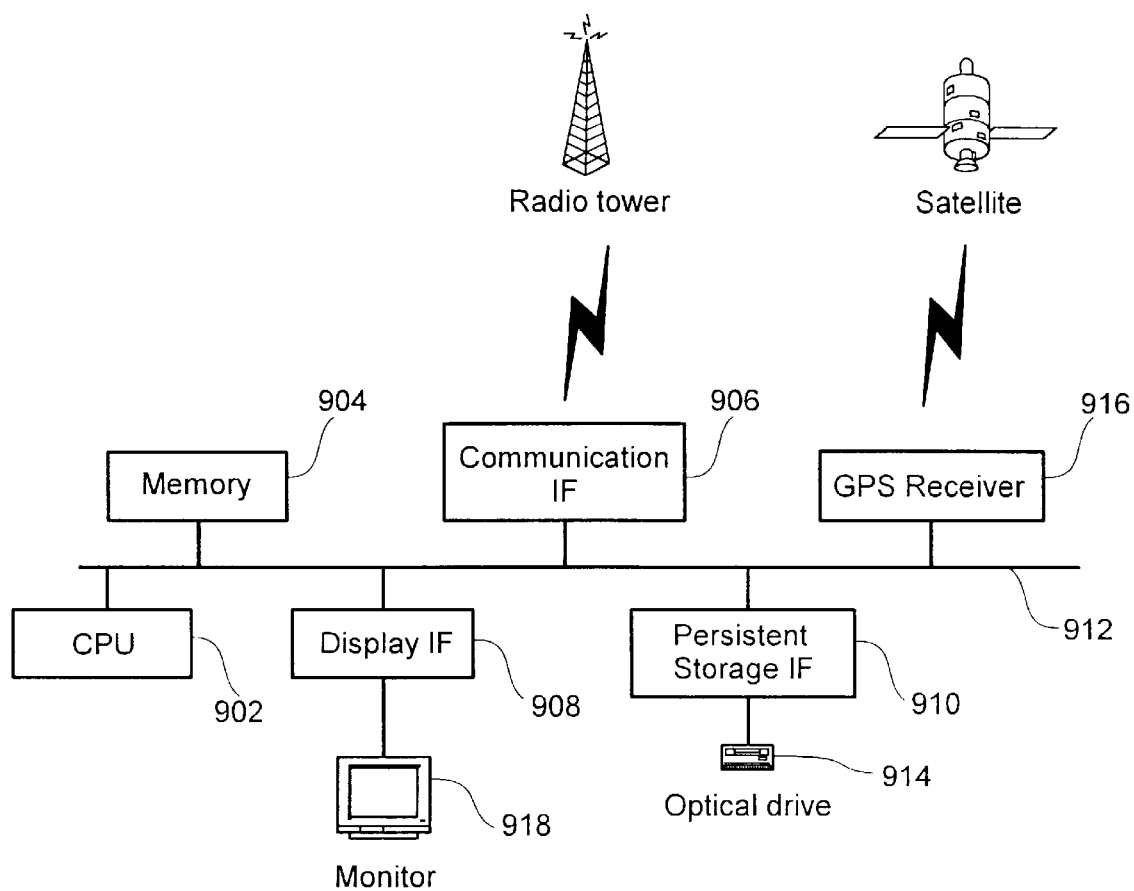
FIG. 9 illustrates a diagram of a representative navigation apparatus in a specific embodiment according to the present invention.

FIG. 9 illustrates a diagram of a representative navigation apparatus in a specific embodiment according to the present invention. FIG. 9 illustrates an apparatus having a processor 902, a memory 904, a communication interface 906, a display interface 908, connecting a display 918, an input device (not shown), a persistent storage interface 910, connecting a CD/DVD ROM 914, a global position system receiver 916 and a bus 912, that interconnects the processor, the memory the communication interface, the display, the input device, the CD/DVD ROM and the global position system receiver.

Specific embodiments can employ a flash memory for memory 904, for example. Further, in specific embodiments, communication interface 906 can employ any of a variety of protocols, such as an Infrared Data Association (IRDA) protocol, a Bluetooth protocol and an i-mode protocol, for example. Other protocols may be used in embodiments created by those of ordinary skill in the art without departing from the scope of the claimed invention. Apparatus can be embodied in a portable device, semi-portable, or mobile devices, or stationary form factor devices, such as for example, a cellular telephone, a personal data assistant (PDA), a portable computer and a car navigation apparatus. Other form factors may be used in embodiments created by those of ordinary skill in the art without departing from the scope of the claimed invention.

In a representative embodiment according to the present invention, the CD/DVD ROM 914 can store position related information, which can be any of an address, a telephone number, one or more coordinates, latitude and longitude, a narrative comment, advertising, traffic information, and/or associated points of interest, for example.

In a specific embodiment, when the communication interface 906 establishes a wireless communication connection with a portable unit, the apparatus can then receive requests from the portable unit. Then, responsive to receiving such a request, the processor 902 causes the global positioning system receiver 916 to provide location information corresponding to the requests. The processor 902 also causes the display 918 to present a map presentation of the information retrieved from the global positioning system 916.

In a specific embodiment, the processor 902 causes the CD/DVD ROM 914 to provide position related information corresponding to the requests, and thereupon the processor 902 causes display of the position related information on the map presentation.

In a specific embodiment, responsive to a request from a portable unit, the processor 902 causes the information retrieved from the global positioning system receiver 916 to be sent to the portable unit via the wireless communication connection.

In a specific embodiment, the communication interface 906 establishes a wireless communication with a portable unit. Then, responsive to establishing the wireless communication connection with the portable unit, the processor 902 causes the memory 904 to provide location information to the portable unit via the communications interface 906.

In a specific embodiment, the communication interface 906 establishes a wireless communication with a portable unit. Then, responsive to establishing the wireless communication connection with the portable unit, the processor 902 causes the memory 904 to receive location information from the portable unit via the communications interface 906.

Figure 10:
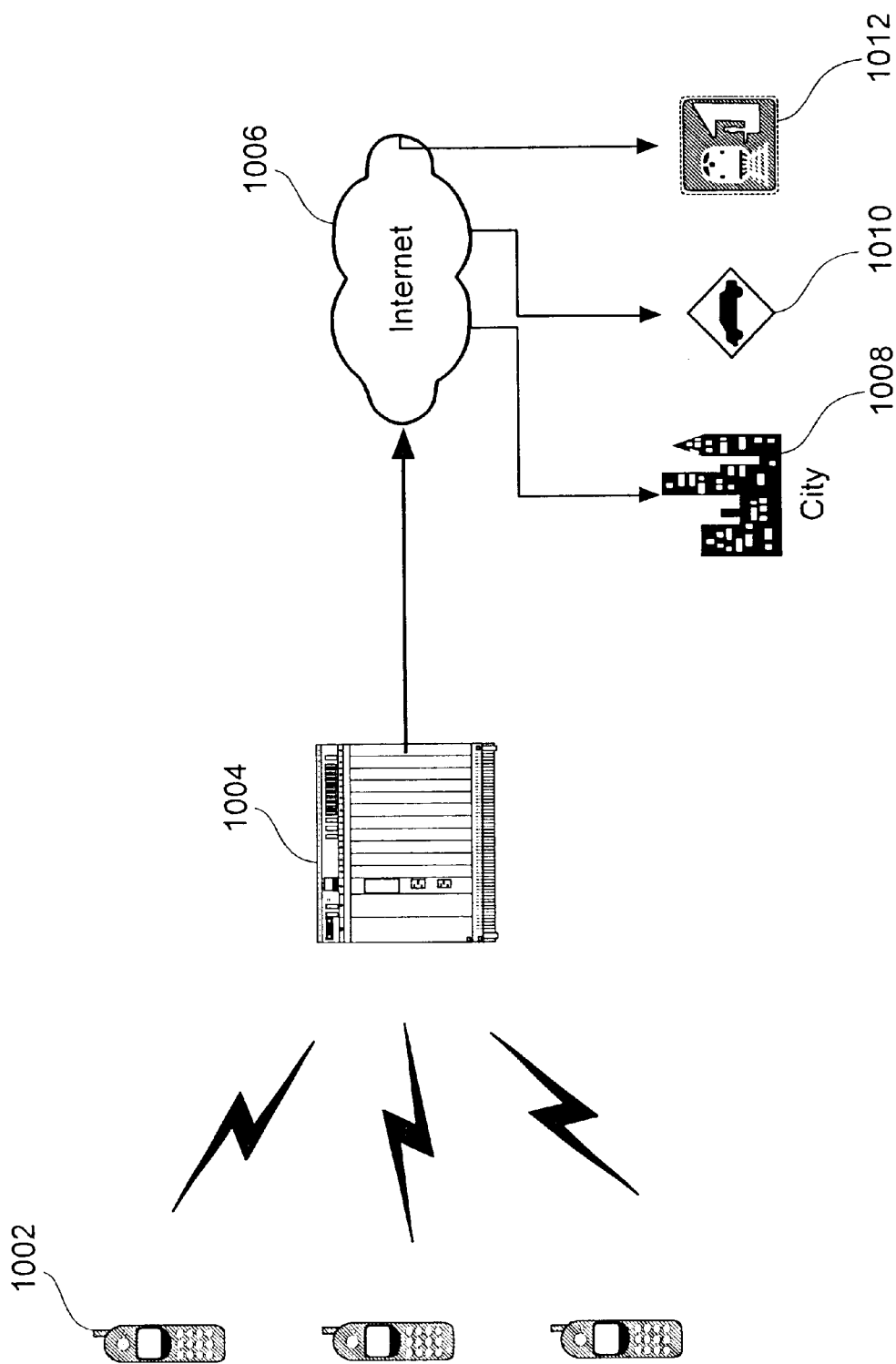
FIG. 10 illustrates a diagram of a representative network for sending and receiving geographic information in a specific embodiment according to the present invention.

FIG. 10 illustrates a diagram of a representative network for sending and receiving geographic information in a specific embodiment according to the present invention. FIG. 10 illustrates a plurality of portable units 1002, embodied as a plurality of cellular telephones, in wireless contact with an i-mode central hub 1004. The i-mode central hub 1004 can communicate via the Internet 1006 with a plurality of other devices, including other portable units, and the like. Specific embodiments can provide communication with various business establishments in a city 1008, a taxi or rental car 1010, or forms of public transportation. Further, information can be exchanged between any of the plurality of units 1002. FIG. 10 illustrates only one of a wide variety of communications networks capable of supporting embodiments according to the present invention readily practiced by those of ordinary skill in the art.

The preceding has been a description of the preferred embodiment of the invention. It will be appreciated that deviations and modifications can be made without departing from the scope of the invention, which is defined by the appended claims.

What is claimed is:

1. A portable information processing apparatus for providing navigation information for a car navigation apparatus, said portable information processing apparatus comprising:

a processor, a memory configured with information representative of a plurality of geographic locations including position related information corresponding to each of said geographic locations, a communication interface, a display, an input device, and a bus, interconnecting said processor, said memory, said communication interface, said display, and said input device;

wherein responsive to said input device receiving a selection of at least one of said geographic locations, said communication interface establishes a wireless communication connection to said car navigation apparatus;

said processor forwards said at least one geographic location and its corresponding position information via said wireless communication connection to said car navigation apparatus, said car navigation apparatus displaying a map based on said at least one geographic location and said corresponding position information.

2. The apparatus of claim 1, wherein said processor causes a list of locations from which said at least one geographic location is selected to be displayed on said display.

3. The apparatus of claim 1, wherein said communication interface, upon receiving information about said at least one of a plurality of locations, provides said information to said processor, and said processor stores said information into said memory.

4. The apparatus of claim 1, wherein said memory further comprises a flash memory.

5. The apparatus of claim 1, wherein said communications interface employs at least one of an Infrared Data Association (IRDA) protocol, a Bluetooth protocol and an i-mode protocol.

6. The apparatus of claim 1, wherein said apparatus is embodied in at least one of a portable device, a semi-portable device, a device affixed to a vehicle.

7. The apparatus of claim 1, wherein said apparatus is embodied in at least one of a vehicle navigation system, a cellular telephone, a personal data assistant (PDA), a portable computer and a car navigation apparatus.

8. The apparatus of claim 1, wherein said memory stores position related information comprising at least one of an address, a telephone number, at least one of a plurality of coordinates, a latitude and longitude, a narrative comment, advertising, traffic information, and associated points of interest.

9. The apparatus of claim 1, wherein said portable information processing apparatus receives fare to at least one geographic location from said car navigation apparatus.

10. The apparatus of claim 9, wherein said portable information processing apparatus sends payment instructions related to said fare.

11. A car navigation apparatus for presenting navigation information, said car navigation apparatus comprising:
   a processor,
   a memory configured with information representative of a plurality of geographic locations including position related information corresponding to each of said geographic locations,
   a communication interface,
   a display,
   an input device,
   a global positioning system receiver, and
   a bus, interconnecting said processor, said memory said communication interface, said display, said input device, and said global positioning system receiver;
   wherein said communication interface is configured to establish a wireless communication connection to a portable information processing apparatus, and thereupon receives requests via said wireless communication connection from said portable information processing apparatus; and wherein, responsive to receiving said requests, said processor causes said global positioning system receiver to provide said position related information corresponding to geographic locations in said requests; and thereupon, said processor causes said display to present a map presentation of said position related information retrieved from said global positioning system.

12. The apparatus of claim 11, further comprising:
   a CD/DVD ROM; and wherein said processor causes said CD/DVD ROM to said provide position related information corresponding to geographic locations in said requests, and thereupon said processor causes display of said position related information on said map presentation.

13. The apparatus of claim 12, wherein said position related information comprises at least one of an address, a telephone number, at least one of a plurality of coordinates, a latitude and longitude, a narrative comment, advertising, traffic information and associated points of interest.

14. The apparatus of claim 11, wherein responsive to a request from a portable unit, said processor causes said position related information retrieved from said global positioning system to be sent via said wireless communication connection.

15. The apparatus of claim 11, wherein said memory further comprises a flash memory.

16. The apparatus of claim 11, wherein said communications interface employs at least one of an Infrared Data Association (IRDA) protocol, a Bluetooth protocol and an i-mode protocol.

17. The apparatus of claim 11, wherein said apparatus is embodied as at least one of a portable device, a semi-portable device and a navigational device affixed to a vehicle.

18. The apparatus of claim 11, wherein said apparatus is embodied in at least one of a cellular telephone, a personal data assistant (PDA), a portable computer and a car navigation apparatus.

19. The apparatus of claim 11, wherein said portable information processing apparatus receives fare to at least one geographic location from said car navigation apparatus.

20. The apparatus of claim 19, wherein said portable information processing apparatus sends payment instructions related to said fare.

21. A portable information processing apparatus for providing navigation information for a car navigation apparatus, said portable information processing apparatus comprising:
   a processor;
   a memory;
   a communication interface;
   a display;
   an input device; and
   a bus, interconnecting said processor, said memory, said communication interface, said display, and said input device,
   wherein said communication interface is operable to establish a wireless communication connection exclusive of a telephone network to said car navigation apparatus in response to said input device receiving a selection of at least one of a plurality of geographic locations,
   said processor forwarding position related information corresponding to said at least one geographic location via said wireless communication connection to said car navigation apparatus, said car navigation apparatus displaying a map based on said at least one geographic location and said corresponding position related information.

* * * * *